US007016985B2

(12) United States Patent
Johnson

(10) Patent No.: US 7,016,985 B2
(45) Date of Patent: *Mar. 21, 2006

(54) METHOD, SYSTEM, AND PROGRAM FOR PRIORITIZING INPUT/OUTPUT (I/O) REQUESTS SUBMITTED TO A DEVICE DRIVER

(75) Inventor: Richard H. Johnson, Cupertino, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 10/902,615

(22) Filed: Jul. 28, 2004

(65) Prior Publication Data

US 2005/0005034 A1 Jan. 6, 2005

Related U.S. Application Data

(63) Continuation of application No. 09/817,442, filed on Mar. 26, 2001, now Pat. No. 6,834,315.

(51) Int. Cl.
*G06F 3/00* (2006.01)

(52) U.S. Cl. .............................. 710/6; 710/39; 710/44

(58) Field of Classification Search .................... 710/6, 710/5, 39, 40, 44, 45

See application file for complete search history.

(56) References Cited

U.S. PATENT DOCUMENTS

| | | | | |
|---|---|---|---|---|
| 4,481,572 A | | 11/1984 | Ochsner | |
| 5,220,653 A | * | 6/1993 | Miro | 709/107 |
| 5,469,560 A | | 11/1995 | Beglin | |
| 5,504,894 A | | 4/1996 | Ferguson et al. | |
| 5,592,612 A | | 1/1997 | Birk | |
| 5,668,995 A | | 9/1997 | Bhat | |
| 5,732,239 A | | 3/1998 | Tobagi et al. | |
| 5,784,647 A | * | 7/1998 | Sugimoto | 710/39 |
| 6,016,527 A | * | 1/2000 | DeMoss | 710/117 |
| 6,055,564 A | * | 4/2000 | Phaal | 709/207 |
| 6,157,963 A | * | 12/2000 | Courtright et al. | 710/5 |

* cited by examiner

*Primary Examiner*—Kim Huynh
(74) *Attorney, Agent, or Firm*—David W. Victor; Konrad Raynes & Victor LLP

(57) ABSTRACT

Provided is a method, system, and program for managing Input/Output (I/O) requests generated by an application program. The I/O requests are transmitted to an output device. A determination is made of a priority associated with the I/O request, wherein the priority is capable of being at least one of a first priority and a second priority. The I/O request is transmitted if the determined priority is the first priority. Transmittal of the I/O request is deferred if the determined priority is the second priority.

46 Claims, 4 Drawing Sheets

METHOD, SYSTEM, AND PROGRAM FOR PRIORITIZING INPUT/OUTPUT (I/O) REQUESTS SUBMITTED TO A DEVICE DRIVER

RELATED APPLICATIONS

This application is a continuation of patent application Ser. No. 09/817,442, filed Mar. 26, 2001, which patent application is incorporated herein by reference in its entirety

BACKGROUND OF THE INVENTION

1. Field of the Invention

The present invention relates to a method, system, and program for prioritizing input/output (I/O) requests submitted to a device driver.

2. Description of the Related Art

A host or server system may concurrently execute multiple application programs that generate Input/Output (I/O) requests that are transmitted to a host bus adaptor providing a link to a storage subsystem. The storage subsystem may be comprised of multiple disks, such as the case with a Direct Access Storage Device (DASD), Just a Bunch of Disks (JBOD), a Redundant Array of Independent Disks (RAID), etc. In such subsystems, each application executing in the host may be assigned to use a particular logical volume in the storage subsystem, also referred to as a Logical Unit Number (LUN).

Certain applications executing in a host may be mission critical. For instance, database application programs may require immediate read/write access to storage to ensure that updates are hardened in storage and requested data is received immediately because performance delays could have costly consequences. For instance a large database for a financial institution receiving real-time financial transactions is mission critical in that it is imperative that such real-time financial transactions be immediately applied to storage and that account data be immediately accessible to the application to enable authorized transactions. On the other hand, other applications executing in the host may not be mission critical and the data they generate is of less critical value. For instance, an accounting or engineering department may not need immediate access to data. Further, the loss of data may not result in significant liability and lost data may readily be recovered or reconstructed.

There is a need in the art to provide an improved technique for handling I/O requests for different applications executing within a host that is sensitive to the importance of the I/O requests generated from different applications.

SUMMARY OF THE PREFERRED EMBODIMENTS

Provided is a method, system, and program for managing Input/Output (I/O) requests generated by an application program. The I/O requests are transmitted to an output device. A determination is made of a priority associated with the I/O request, wherein the priority is capable of being at least one of a first priority and a second priority. The I/O request is transmitted if the determined priority is the first priority. Transmittal of the I/O request is deferred if the determined priority is the second priority.

Additionally, the determined priority is related to a priority associated with the application that generated the I/O request.

Still further, the output device may comprise a storage device comprised of at least one logical volume, wherein the I/O request is directed toward the one logical volume in the storage device. In such case, a data structure capable of associating one or more of the logical volumes with the first or second priority is provided, wherein determining the priority associated with the I/O request comprises determining from the data structure whether the logical volume of the I/O request is associated with the first priority or second priority.

In still further implementations, a determination is made as to whether any I/O requests of the first priority are pending at a location, such as a device driver. The transmittal of the I/O requests of the second priority are deferred if there are any I/O requests of the first priority pending at the location. The I/O request of the second priority are transmitted to the location if there are no I/O requests of the first priority pending at the device driver.

The described implementations provide a technique for managing the flow of I/O requests to a device driver to ensure that I/O requests associated with a higher priority application or storage space receive preference in processing at the device driver over I/O requests associated with a lower priority.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
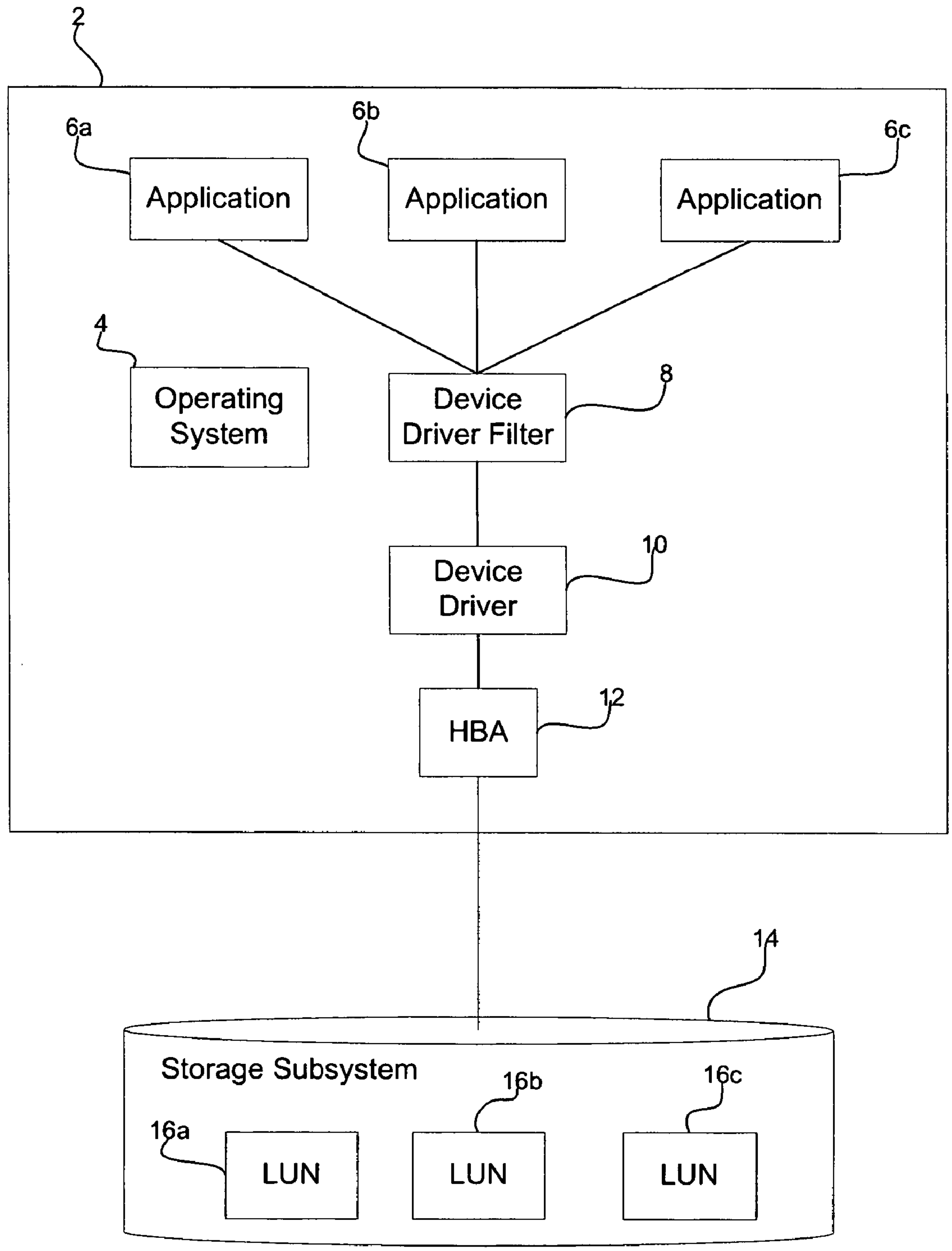
FIG. 1 is a block diagram illustrating a computing environment in which certain aspects of the invention are implemented.

FIG. 1 illustrates a computing environment including certain implementations of the invention. A host 2 system includes an operating system 4 and is capable of executing multiple application programs 6*a, b, c*. The applications 6*a, b, c* generate Input/Output (I/O) requests that are transferred to a device driver filter 8, which controls the flow of the I/Os to a device driver 10 in accordance with the below discussed implementations. The device driver 10 then communicates the I/O requests to a host bus adaptor (HBA) 12 to transfer to a storage subsystem 14 in a manner known in the art. The storage subsystem 14 includes multiple logical volumes identified as logical unit numbers (LUN) 16*a, b, c*. In certain implementations, each application 6*a, b, c* is assigned a particular logical volume 16*a, b, c* to use for I/O requests, such that the application 6*a, b, c* only directs reads and writes to the assigned logical volume 16*a, b, c*.

The host 2 may comprise any computational device capable of executing multiple application programs and transferring data to a storage subsystem 12, including a server class machine, a mainframe, desktop computer, laptop computer, hand held computer, telephony device, etc. The operating system 4 may comprise any operating system known in the art capable of concurrently executing multiple application programs 6*a, b, c* and concurrently generating I/O requests. The storage subsystem 14 may comprise any storage device known in the art, such as a Direct Access Storage Device (DASD), Just a Bunch of Disks (JBOD), a Redundant Array of Independent Disks (RAID), tape library, optical library, etc. The device driver filter 8 and device driver 10 may be implemented as software programs that execute within the host 2 or their code may be implemented in a hardware device, such as integrated circuit logic.

Figure 2:
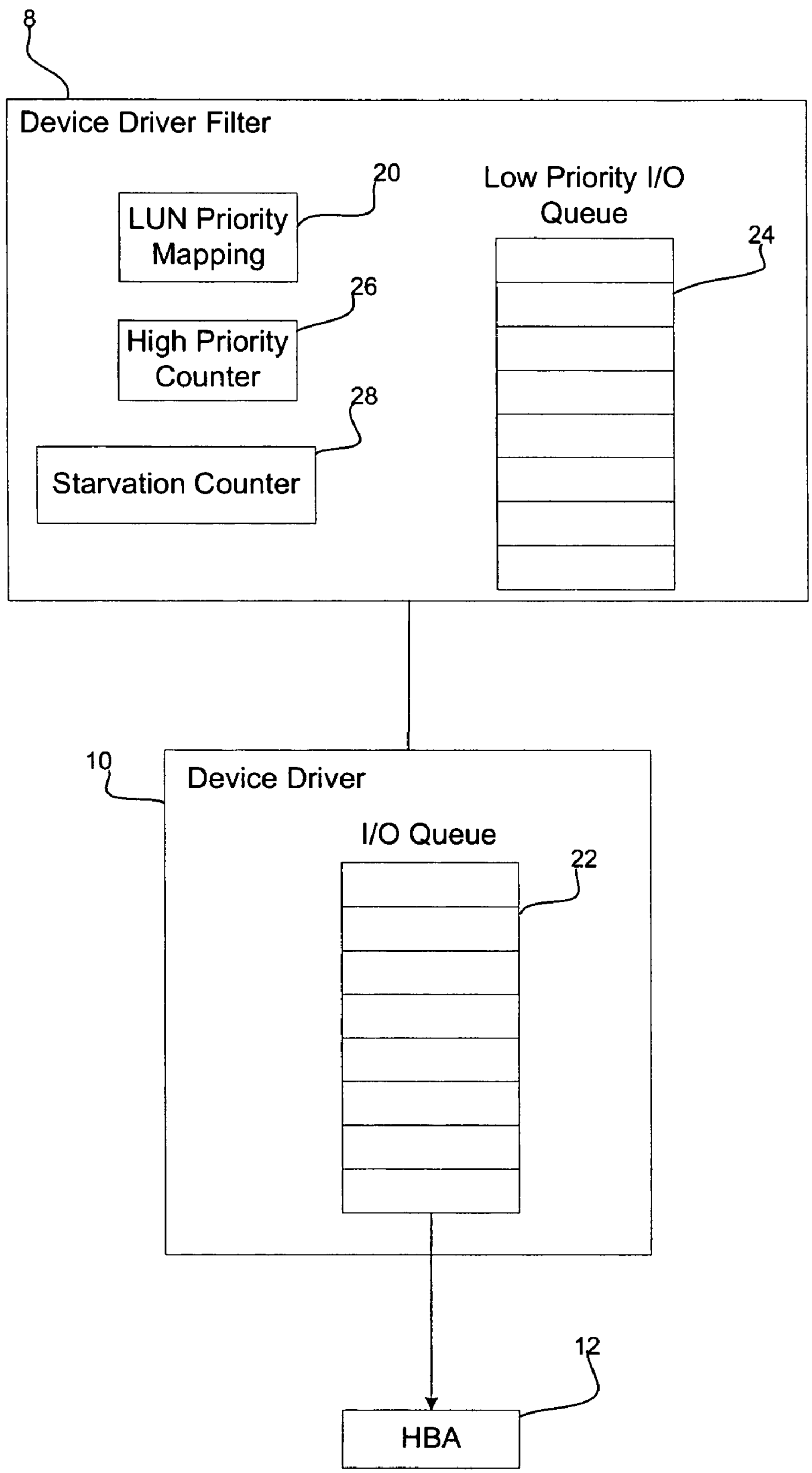
FIG. 2 illustrates data structures used to manage the flow of I/O requests to a device driver in accordance with implementations of the invention.

FIG. 2 illustrates one implementation of data structures the device driver filter 8 maintains to manage I/O requests from the applications 6*a, b, c*. A LUN priority mapping 20 provides administrator set priorities for each LUN. In certain described implementations, two priorities are used, high and low. In such case, the LUN priority mapping 20 would indicate which LUNs 16*a, b, c* in the storage subsystem 14 have high or low priority. If no priority for a LUN is indicated, then it may be assumed that such LUN is associated with a low priority. A system administrator having knowledge of the application programs 6*a, b, c* running in the host 2 may set the priority for each LUN 16*a, b, c* based on the importance of the data generated by the application 6*a, b, c* that utilizes such LUN 16*a, b, c*.

The device driver 10 maintains an I/O queue 22 for controlling the transfer of I/O requests through the host bus adaptor (HBA) 12 in a manner known in the art. In accordance with certain described implementations of the invention, the device driver filter 8 maintains a low priority I/O queue 24 to queue low priority requests that the device driver filter 8 defers or holds to give preference to higher priority I/Os. The device driver 8 further maintains a high priority counter 26 indicating the number of high priority I/O requests pending in the I/O queue 22 at the device driver 10 not yet transmitted to the host bus adaptor 12. A starvation counter 28 provides a count of the number of high priority I/O requests that the device driver 10 successfully transmitted to the host bus adaptor 12 while deferred low priority I/O requests are pending in the low priority I/O queue 24. If the starvation counter 28 reaches a predetermined maximum value, then requests are processed from the low priority I/O queue to prevent starvation of the low priority I/O requests in the event there is a stream of numerous high priority I/O requests. The data structures 20, 22, 24, 26, and 28 may be maintained in any local storage and/or memory unit of the host 2.

Figure 3:
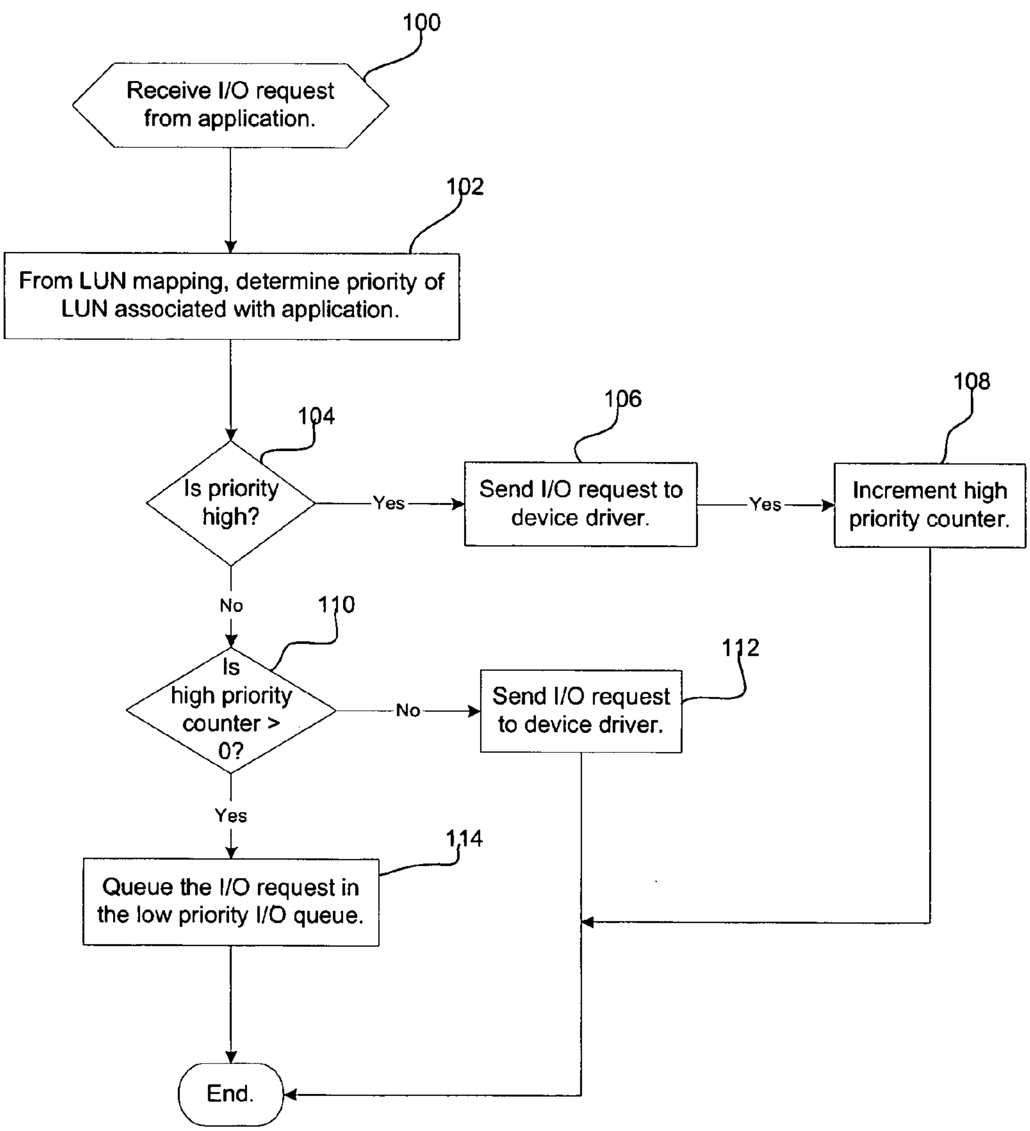
FIGS. 3 and 4 illustrate logic implemented in a device driver filter program to manage the flow of I/O requests to a device driver in accordance with implementations of the invention.
Figure 4:
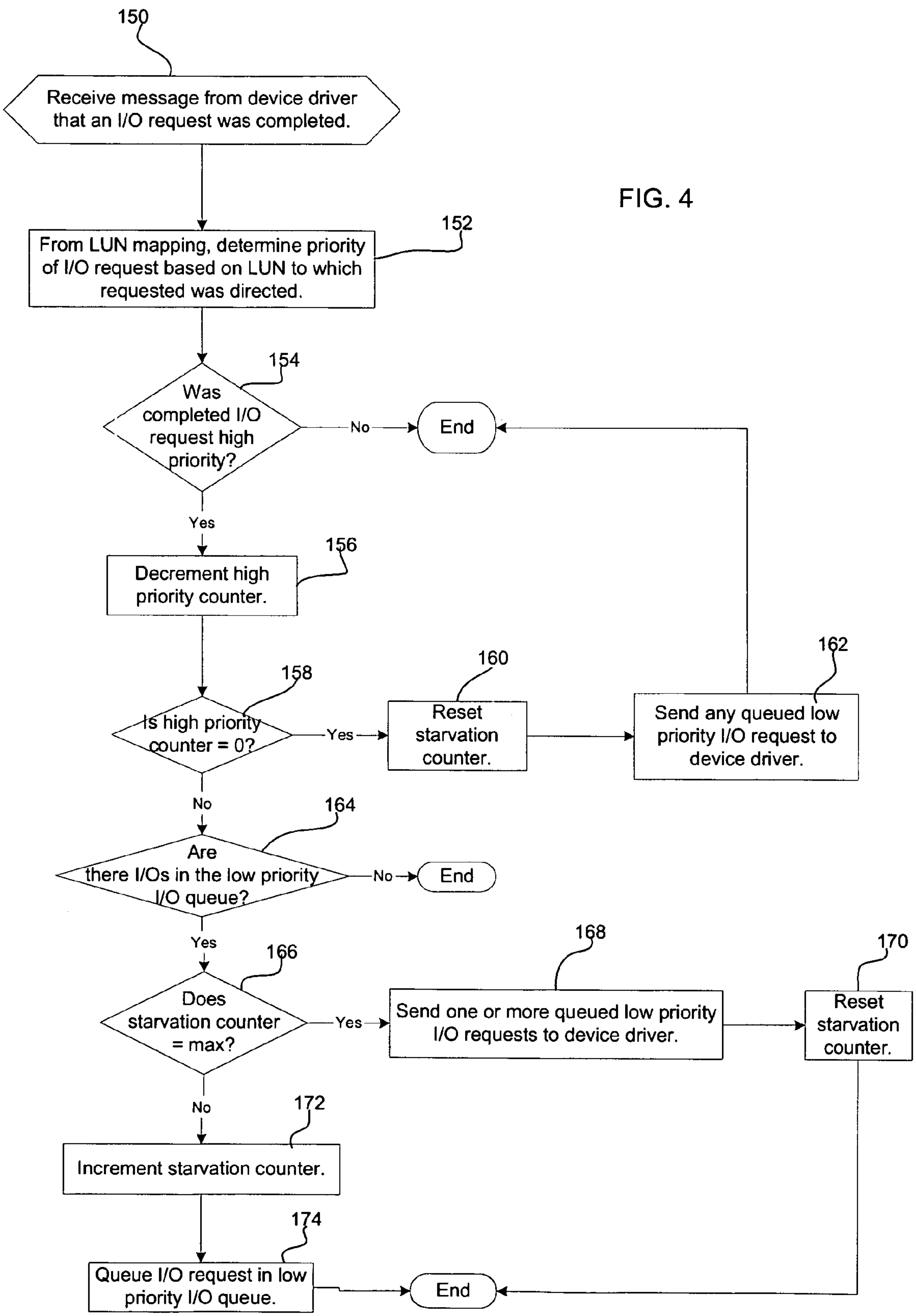

FIGS. 3 and 4 illustrate logic implemented within the device driver filter 8 to handle I/O requests from the applications 6*a, b, c* in a manner that favors the applications generating relatively more important data. A system administrator would edit the LUN priority mapping 20 to specify those LUNs used by applications 6*a, b, c* deemed to be of a high priority, or critical. Upon initialization of the device driver filter 8, the high priority counter 26 and starvation counter 28 are initialized to zero, and the low priority I/O queue 24 is empty.

With respect to FIG. 3, control begins at block 100 with the device driver filter 8 receiving an I/O request from one application 6*a, b, c*. The device driver filter 8 processes (at block 102) the LUN priority mapping 20 to determine the priority of the LUN associated with the application 6*a, b, c* submitting the I/O request. As discussed, in certain implementations, if no priority (e.g., high or low) is specified, then the priority is assumed to be low or, alternatively, high priority. If (at block 104) the priority is high, then the device driver filter 8 sends (at block 106) the I/O request to the device driver 10 to process in a manner known in the art. The filter 8 increments (at block 108) the high priority counter 26 indicating a pending high priority I/O request at the device driver 10. If (at block 104) the I/O request has a low priority and if (at block 110) the high priority counter 26 is greater than zero, indicating there are high priority I/O requests pending at the device driver 10, then the device driver filter 8 queues (at block 114) the I/O request in the low priority I/O queue 24 to defer transmittal to the device driver 10. If (at block 104) the high priority counter 26 is zero, indicating no high priority I/O requests pending at the device driver 10, then the device driver filter 8 sends (at block 112) the I/O request to the device driver 10. As discussed, the device driver 10 queues received I/O requests in the I/O queue 22.

FIG. 4 illustrates logic implemented in the device driver filter 8 to handle messages from the device driver 10 indicating that one of the I/O requests pending at the device driver 10 was successfully completed or transmitted through the host bus adaptor (HBA) 12 to the storage subsystem 14. The device driver filter 8 and device driver 10 would both include code to allow communication therebetween. For instance, the device driver 10 would include code to receive I/O requests from the device driver filter 8 and return status to the device driver filter 8 on completed I/O requests. With respect to FIG. 4, control begins at block 150 when the device driver filter 8 receives a message from the device driver 10 indicating that an I/O request was transmitted through the host bus adaptor 12, i.e., completed. The message returned by the device driver 10 may identify the completed I/O request. Alternatively, the device driver 10 may process I/O requests on a First-In-First-Out basis. In such case, the device driver 10 would process the earliest I/O request the device driver filter 8 transmitted to the device driver 10.

Upon receiving the message and identifying the I/O request and targeted LUN 16*a, b, c*, the device driver filter 8 would determine (at block 152) from the LUN priority mapping 20 a priority assigned to the LUN 16*a, b, c* to which the completed I/O request was directed. If (at block 154) the I/O request is not a high priority request, i.e., a high priority LUN, then control ends. Otherwise, if the priority is high, then the device driver filter 8 decrements (at block 156) the high priority counter 26 to indicate one less high priority I/O request pending at the device driver 10. If (at block 158) the high priority counter is zero, indicating no more pending high priority I/O requests at the device driver 10, then the device driver filter 8 resets (at block 160) the starvation counter 28 to zero and sends (at block 162) any deferred low priority I/O requests pending in the low priority I/O queue 24 to the device driver 10. Because the device driver 10 has completed all high priority requests, the device driver filter 8 can transmit any subsequent low priority I/O requests to the device driver 10. Transmittal of the low priority I/O requests will not affect device driver 10 performance with respect to processing high priority I/O requests because no high priority requests are pending.

If (at block 158) the high priority counter is not zero, then there are pending high priority I/O requests. In such case, the device driver filter 8 determines (at block 164) whether there are any deferred I/Os pending in the low priority I/O queue 24. If not, then control ends as no consideration of any deferred low priority I/Os is necessary. Otherwise, if there are deferred low priority I/Os, then the device driver filter 8 determines (at block 166) whether the starvation counter 28 is at the maximum possible value. If so, then enough high priority I/O requests have been processed over deferred low I/O priority requests to warrant processing some of the deferred low I/O priority requests. In such case, the device driver filter 8 sends (at block 168) a predetermined number of deferred I/Os in the low priority I/O queue 24 to the device driver 10 and resets (at block 170) the starvation counter 28 to zero. The logic of FIG. 4 services deferred low priority I/O requests when there are pending high priority I/Os to avoid an "I/O starvation" situation from a lengthy string of high priority I/O requests that could prevent processing of the lower priority I/O requests for an extended period of time and adversely affect the performance and operation of the applications 6*a, b, c* initiating the low priority requests.

If (at block 166) the starvation counter is not at the maximum possible value, then the starvation counter 28 is incremented (at block 172) and the I/O request is queued (at block 174) in the low priority I/O queue 24. The deferred low priority I/O requests in the low priority I/O queue 28 are not sent to the device driver 10 until the starvation counter reaches the maximum value while the high priority requests are pending.

With the above logic of FIGS. 3 and 4, the device driver filter 8 queues low priority I/O requests and only forwards high priority I/Os request when there are I/Os pending at the device driver 10 that are directed toward the high priority LUNs 16*a, b, c*. The above technique provides faster processing of high priority I/Os because while high priority I/Os are pending, the device driver 10 does not have to interrupt processing of high priority I/Os to handle low priority I/Os.

In certain implementations, a device driver filter 8 and device driver 10 would be maintained for each host adaptor in the host 2 to separately queue and control the flow of I/O requests for a particular driver 10.

Certain storage subsystems may utilize priority information provided with an I/O request. For instance, the IBM Enterprise Storage Server (ESS) allows hosts to specify priority for individual I/O requests. For such storage subsystems, the device driver filter 8 may include code to associate the priority determined from the LUN priority mapping 20 to the I/O request for use by the storage subsystem 14. The storage subsystem 14 could then utilize such priority provided by the device driver filter 8 to prioritize the manner in which I/Os are handled. In such implementations, the priorities set by the device driver filter 8 would affect how the storage subsystem 14 handles I/O requests received from different hosts.

In certain described implementations, the device driver filter 8 can be implemented as part of the device driver 10 code to function as a separate program layer between applications 6*a, b, c* submitting I/O requests and the device driver 10. Alternatively, the device driver filter 8 may operate between the logical volume manager (not shown) of the host operating system 4 and the device driver 10. In such implementations, the volume manager of the operating system 4 would transfer an I/O request to the device driver filter 8 first, instead of the device driver 10. However, the device driver filter 8 is only used for I/Os flowing from the host to the storage subsystem 14, not for data returned in response to I/Os. For data received from the storage subsystem 14, the device driver 10 would return the data to the operating system 4 to provide to the requesting application 6*a, b, c*.

The following describes some alternative implementations.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The described implementations provided a technique for managing the flow of I/Os to a device driver for a storage device. Additionally, the above described filter program may be used with a device driver enabling communication with any type of I/O device, such as any type of input/output (I/O) device (e.g., printer, scanner, etc.), network adaptors, controllers, etc.

The above described implementations utilized two priority values, high and low. In alternative implementations, there may be more than two priority levels that the filter considers when determining how I/Os are sent to the device driver.

In the described implementations, a device driver filter was separately maintained for each host bus adaptor in the host. Alternatively, there may be one device driver filter and related data structures for managing the flow of I/Os to multiple host bus adaptors or output devices.

In the described implementations, priority was associated with logical volumes in the storage device. Alternatively, the priority may be associated with the application itself or some other factor, and not tied directly to the logical volumes in storage.

In additional implementations, an application may be capable of assigning one of multiple priorities to an I/O request that would be used by the device driver filter to determine how to transmit I/Os to the device driver.

In a network environment, multiple host systems may each separately utilize the device driver filter of the described implementations for each host bus adaptor to control the flow of I/O requests to device drivers.

In further implementations, one application program may be capable of generating I/O requests having different priorities. For instance, one application program may direct I/Os to different LUNs, where each LUN is associated with a different priority. The preferred logic of FIGS. 3 and 4 described specific operations occurring in a particular order. In alternative embodiments, certain of the logic operations may be performed in a different order, modified or removed and still implement preferred embodiments of the present invention. Morever, steps may be added to the above described logic and still conform to the preferred embodiments.

Therefore, the foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for managing Input/Output (I/O) requests generated by an application program to transmit to a storage device comprised of at least one logical volume and wherein the I/O request is directed toward one logical volume in the storage device, wherein transmitting the I/O requests comprises:

providing a data structure capable of associating one or more of the logical volumes with a first or second priority;

processing one I/O request to determine whether to transmit the I/O request to a component or to defer the I/O request;

determining from the data structure whether the logical volume of the processed I/O request is associated with the first priority or second priority in response to processing the I/O request;

transmitting the processed I/O request to the component if the determined priority is the first priority; and deferring transmittal of the processed I/O request to the component if the determined priority is the second priority.

2. The method of claim 1, wherein the determined priority is related to a priority associated with the application that generated the I/O request.

3. The method of claim 1, wherein multiple application programs are capable of generating I/O requests, wherein at least a first end second application programs are associated with different logical volumes, wherein the first application program is more mission critical than the second application program, and wherein the logical volume used by the first application program is associated with the first priority and the logical volume used by the second application program is associated with the second priority.

4. The method of claim 1, wherein deferring transmittal of the I/O request further comprises:

queuing I/O requests of the second priority.

5. The method of claim 1, further comprising:

determining whether transmitted I/O requests of the first priority are pending, wherein the transmittal of the processed I/O request of the second priority is deferred if there are transmitted I/O requests of the first priority pending; and transmitting without deferral the processed I/O request of the second priority if there are no transmitted I/O requests of the first priority pending.

6. The method of claim 5, further comprising:

transmitting deferred I/O requests of the second priority after determining that there are no transmitted I/O requests of the first priority pending.

7. The method of claim 5, wherein the component comprises a device driver that further transmits the I/O requests to an output device, wherein the transmitted I/O requests are pending at the device driver.

8. The method of claim 5, wherein the determination of whether I/O requests of the first priority are pending comprises:

maintaining a counter indicating a number of completed I/O requests of the first priority while there are deferred I/O requests of the second priority; and incrementing the counter in response to receiving a message that one I/O request of the first priority completed; and transmitting at least one deferred I/O request of the second priority to the component if the counter equals a predetermined number.

9. The method of claim 1, wherein the component comprises a device driver, wherein the device driver transmits the I/O requests to an adaptor to communicate to an output device, and wherein priority is determined and I/O requests deferred separately for each adaptor.

10. The method of claim 1, wherein an output device utilizes a priority scheme to determine an order in which I/O requests are processed, further comprising:

associating the determined priority with the I/O request, wherein the associated priority is transmitted with the I/O request to the output device to use when determining the order in which to process I/O requests from multiple device drivers.

11. The method of claim 1, wherein the component comprises a device driver that further transmits the I/O requests to an output device, and wherein priority is determined and I/O requests deferred separately for each device driver.

12. The method of claim 1, wherein the component comprises a device driver, wherein the operations of determining the priority associated with the I/O request, transmitting the I/O request, and deferring transmittal of the I/O request are performed by a filter that is separate from the device driver that receives the transmitted I/O requests and further transmits I/O requests to an output device, wherein the installation of the filter does not modify the device driver code.

13. A method for managing Input/Output (I/O) requests generated by an application program, wherein the I/O requests are transmitted to a device driver that further transmits the I/O requests to an output device, comprising:

processing the I/O request to determine whether to transmit the I/O request to the device driver or defer the I/O request;

determining a priority associated with the processed I/O request, wherein the priority is capable of being at least one of a first priority and a second priority;

transmitting the processed I/O request to the device driver if the determined priority is the first priority;

determining whether there are requests having the first priority at the device driver;

deferring transmittal of the processed I/O request to the device driver if the determined priority is the second priority and if there are requests having the first priority at the device driver; and transmitting without deferral the processed I/O request of the second priority to the device driver if there are no I/O requests of the first priority pending at the device driver.

14. The method of claim 13, wherein the determined priority is related to a priority associated with the application that generated the I/O request.

15. The method of claim 13, wherein the output device comprises a storage device comprised of at least one logical volume and wherein the I/O request is directed toward one logical volume in the storage device, further comprising:

providing a data structure capable of associating one or more of the logical volumes with the first or second priority, wherein determining the priority associated with the I/O request comprises determining from the data structure whether the logical volume of the I/O request is associated with the first priority or second priority.

16. The method of claim 15, wherein multiple application programs are capable of generating I/O requests, wherein at least a first and second application programs are associated with different logical volumes, wherein the first application program is more mission critical than the second application program, and wherein the logical volume used by the first application program is associated with the first priority and the logical volume used by the second application program is associated with the second priority.

17. The method of claim 13, wherein deferring transmittal of the I/O request further comprises:

queuing I/O requests of the second priority.

18. The method of claim 13, further comprising:

transmitting at least one deferred I/O request of the second priority to the device driver after determining that there are no I/O requests of the first priority pending at the device driver.

19. A system for managing Input/Output (I/O) requests to transmit to a storage device comprised of at least one logical volume and wherein the I/O request is directed toward one logical volume in the storage device, comprising:

a computer system;

a data structure associating one or more of the logical volumes with the first or second priority;

a component;

at least one application program executing in the computer system, wherein the application program generates I/O requests;

means for processing one of the I/O requests to determine whether to transmit the I/O request to the component or to defer the I/O request;

means for determining from the data structure whether the logical volume of the processed I/O request is associated with the first priority or second priority in response to processing the I/O request;

means for transmitting the processed I/O request to the component if the determined priority is the first priority; and means for deferring transmittal of the processed I/O request to the component if the determined priority is the second priority.

20. The system of claim 19, wherein the determined priority is related to a priority associated with the application that generated the I/O request.

21. The system of claim 19, wherein multiple application programs are capable of generating I/O requests, wherein at least a first and second application programs are associated with different logical volumes, wherein the first application program is more mission critical than the second application program, and wherein the logical volume used by the first application program is associated with the first priority and the logical volume used by the second application program is associated with the second priority.

22. The system of claim 19, wherein the means for deferring transmittal of the I/O request further performs:

queuing I/O requests of the second priority.

23. The system of claim 19, further comprising:

means for determining whether transmitted I/O requests of the first priority are pending, wherein the transmittal of the processed I/O request of the second priority is deferred if there are transmitted I/O requests of the first priority pending; and means for transmitting without deferral the processed I/O request of the second priority to the location if there are no transmitted I/O requests of the first priority pending at the device driver.

24. The system of claim 23, further comprising:

means for transmitting deferred I/O requests of the second priority after determining that there are no transmitted I/O requests of the first priority pending.

25. The system of claim 23, wherein the means for determining whether I/O requests of the first priority are pending performs:

maintaining a counter indicating a number of completed I/O requests of the first priority while there are deferred I/O requests of the second priority; and incrementing the counter in response to receiving a message from the device driver that one I/O request of the first priority completed, wherein the at least one deferred I/O request of the second priority is transmitted to the component if the counter equals the predetermined number.

26. The system of claim 19, wherein the component comprises a device driver that transmits the I/O requests to an output device, wherein the device driver receives the transmitted I/O requests and further transmits the I/O requests to the output device, wherein the location at which I/O requests are capable of pending comprises the device driver.

27. The system of claim 19, wherein the I/O requests are transmitted to an output device, wherein the component comprises a device driver for receiving the transmitted I/O requests further comprising:

an adaptor to communicate I/O requests to the output device, wherein the device driver further transmits the I/O requests to the adaptor, and wherein priority is determined and I/O requests deferred separately for each adaptor.

28. The system of claim 19, wherein an output device utilizes a priority scheme to determine an order in which I/O requests are processed, further comprising:

means for associating the determined priority with the I/O request, wherein the associated priority is transmitted with the I/O request to the output device to use when determining the order in which to process I/O requests from multiple device drivers.

29. The system of claim 19, wherein the I/O requests are transmitted to an output device, wherein the component comprises a device driver that receives the transmitted I/O requests and further transmits the I/O requests to the output device, wherein priority is determined and I/O requests deferred separately for each device driver.

30. The system of claim 19, wherein the I/O requests are transmitted to an output device, wherein the component comprises a device driver that receives the transmitted I/O requests and further transmits the I/O requests to the output device, wherein the means for determining the priority associated with the I/O request, transmitting the I/O request to the device driver, and deferring transmittal of the I/O request to the device driver are performed by a filter that is separate from the device driver, and wherein the installation of the filter does not modify the device driver code.

31. A system for managing Input/Output (I/O) requests to transmit to an output device, comprising:

a computer system;

at least one application program executing in the computer system, wherein the application program generates I/O requests;

a device driver executing in the computer system, wherein the device driver transmits received I/O requests to the output device;

means for processing one of the I/O requests to determine whether to transmit the I/O request to the device driver or defer the I/O request;

means for determining a priority associated with the processed I/O request generated by the application program, wherein the priority is capable of being at least one of a first priority and a second priority;

means for transmitting the processed I/O request to the device driver if the determined priority is the first priority;

means for determining whether there are requests having the first priority at the device driver;

means for deferring transmittal of the processed I/O request to the device driver if the determined priority is the second priority and if there are requests having the first priority at the device driver; and means for transmitting without deferral the processed I/O request of the second priority to the device driver if there are no I/O requests of the first priority pending at the device driver.

32. The system of claim 31, wherein the determined priority is related to a priority associated with the application that generated the I/O request.

33. An article of manufacture comprising a computer storage media that implements code in communication with a component to manage Input/Output (I/O) requests generated by an application program and transmitted to a storage device comprised of at least one logical volume and wherein the I/O request is directed toward one logical volume in the storage device, wherein the code when executed performs:

providing a data structure capable of associating one or more of the logical volumes with the first or second priority;

processing one of the I/O requests to determine whether to transmit the I/O request to the component or to defer the I/O request;

determining from the data structure whether the logical volume of the processed I/O request is associated with the first priority or second priority in response to processing the I/O request;

transmitting the processed I/O request to the component if the determined priority is the first priority; and deferring transmittal of the processed I/O request if the determined priority is the second priority.

34. The article of manufacture of claim 33, wherein the determined priority is related to a priority associated with the application that generated the I/O request.

35. The article of manufacture of claim 33, wherein multiple application programs are capable of generating I/O requests, wherein at least a first and second application programs are associated with different logical volumes, wherein the first application program is more mission critical than the second application program, and wherein the logical volume used by the first application program is associated with the first priority and the logical volume used by the second application program is associated with the second priority.

36. The article of manufacture of claim 33, wherein deferring transmittal of the I/O request further comprises:

queuing I/O requests of the second priority.

37. The article of manufacture of claim 33, further performing:

determining whether transmitted I/O requests of the first priority are pending, wherein the transmittal of the processed I/O request of the second priority is deferred if there are any transmitted I/O requests of the first priority pending; and transmitting without deferral the processed I/O request of the second priority if there are no transmitted I/O requests of the first priority pending at the location.

38. The article of manufacture of claim 37, further performing:

transmitting deferred I/O requests of the second priority after determining that there are no transmitted I/O requests of the first priority pending.

39. The article of manufacture of claim 37, wherein the I/O requests are transmitted to an output device, wherein the component comprises a device driver that further transmits the I/O requests to the output device, wherein the location at which I/O requests are capable of pending comprises the device driver.

40. The article of manufacture of claim 37, wherein the determination of whether I/O requests of the first priority are pending comprises:

maintaining a counter indicating the number of completed I/O requests of the first priority while there are deferred I/O requests of the second priority; and incrementing the counter in response to receiving a message from the device driver that one I/O request of the first priority completed, wherein the at least one deferred I/O request is transmitted to the component if the counter equals the predetermined number.

41. The article of manufacture of claim 33, wherein the I/O requests are transmitted to an output device, wherein the component comprises a device driver that transmits the I/O requests to an adaptor to communicate to the output device, and wherein priority is determined and I/O requests deferred separately for each adaptor.

42. The article of manufacture of claim 33, wherein an output device utilizes a priority scheme to determine an order in which I/O requests are processed, further comprising:

associating the determined priority with the I/O request, wherein the associated priority is transmitted with the I/O request to the output device to use when determining the order in which to process I/O requests from multiple device drivers.

43. The article of manufacture of claim 33, wherein the component comprises a device driver, wherein the operations of determining the priority associated with the I/O request, transmitting the I/O request, and deferring transmittal of the I/O request are performed by a filter that is separate from the device driver that receives the transmitted I/O requests and further transmits I/O requests to an output device, wherein the installation of the filter does not modify the device driver code.

44. The article of manufacture of claim 43, wherein priority is determined and I/O requests deferred separately for each device driver.

45. An article of manufacture comprising a computer storage media that implements code to manage Input/Output (I/O) requests generated by an application program, wherein the I/O requests are transmitted to a device driver that further transmits the I/O requests to an output device, wherein the code when executed performs:

processing one of the I/O requests to determine whether to transmit the I/O request to the device driver or defer the I/O request;

determining a priority associated with the processed I/O request, wherein the priority is capable of being at least one of a first priority and a second priority;

transmitting the processed I/O request to the device driver if the determined priority is the first priority;

determining whether there are requests having the first priority at the device driver;

deferring transmittal of the processed I/O request to the device driver if the determined priority is the second priority and if there are requests having the first priority at the device driver; and transmitting without deferral the processed I/O request of the second priority to the device driver if there are no I/O requests of the first priority pending at the device driver.

46. The article of manufacture of claim 45, wherein the determined priority is related to a priority associated with the application that generated the I/O request.

* * * * *